United States Patent Office 2,970,943
Patented Feb. 7, 1961

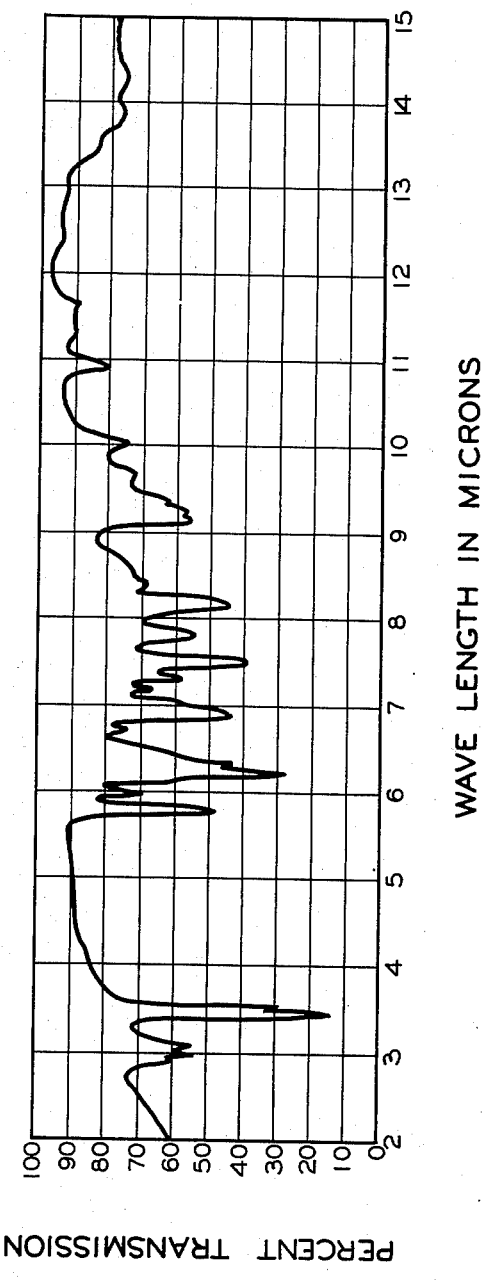

2,970,943
VALACIDIN AND PROCESSES FOR THE PREPARATION THEREOF

William W. Bromer and James M. McGuire, Indianapolis, Ind., assignors to Eli Lilly and Company, Indianapolis, Ind., a corporation of Indiana Filed July 7, 1958, Ser. No. 746,785
7 Claims. (Cl. 167—65)

This invention relates to novel antibiotic substances and to the processes of production and purification thereof.

The novel antibiotic substance of this invention has been identified by its chemical, physical, and biological properties. It is an organic acid which has been arbitrarily named valacidin. The antibiotic readily forms cationic salts, and such salts are included within the scope of this invention.

The free acid form of valacidin has the following characteristics: It is a dark reddish-brown solid. It can be obtained in amorphous form by freeze-drying an aqueous solution of the acid, or by rapidly precipitating the acid from an organic solvent solution by the addition of a solvent in which the acid is insoluble. The acid can readily be crystallized in different crystalline forms which are dependent on the nature of the crystallizing solvent. For example, long, reddish-brown needles melting with decomposition at about 261° C. are formed when ethyl acetate or aqueous acetone is employed as the crystallizing solvent, and reddish-brown plates of about the same melting point are formed when chloroform or tetrahydrofuran is the crystallizing solvent.

The acid form of valacidin is soluble in aqueous, slightly alkaline solutions, as for example, in a 2 percent sodium bicarbonate solution. Additionally, it is soluble in most polar organic solvents illustrative of which are ketones such as acetone and methyl-isobutyl ketone, esters such as ethyl acetate, amyl acetate, and ethyl propionate, chlorinated hydrocarbons such as chloroform and carbon tetrachloride, and heterocyclic organic solvents such as tetrahydrofuran and thiophene. The crystalline acid is slightly soluble in lower alcohols such as methanol and ethanol, but is relatively insoluble in water, dilute acids, and in most nonpolar solvents.

The antibiotic is relatively stable in solution over a pH range of about pH 1 to pH 9, but is unstable in strongly acidic and strongly basic solutions.

An electrometric titration in dimethyl formamide-water solution (2:1, parts by volume) reveals the presence of one titratable group of $pK'_\alpha = 7.0$.

The molecular weight as determined by the titration data is about $490 \pm 20$.

A solubility analysis of crystalline valacidin in tetrahydrofuran which showed the sample to be pure gave a solubility of the antibiotic in tetrahydrofuran of 6.3 mg./ml. at 25.3° C.

An average of several elemental analyses of crystalline valacidin dried in vacuo at 70–80° C. over phosphorus pentoxide, gave the following values:

| | Percent |
|---|---|
| Carbon | 60.01 |
| Hydrogen | 4.66 |
| Nitrogen | 10.80 |
| Oxygen (by difference) | 24.53 |

The above elemental analysis values indicate an empirical formula of the antibiotic of about $C_{26}H_{24}O_8N_4$.

A mineral oil mull of a sample of the crystalline antibiotic dried as above described, gives the following distinguishable bands in an infrared spectrum over the range of $2.0\mu$ to $15.0\mu$: 2.90, 2.98, 3.07, 5.74, 5.95, 6.09, 6.18, 6.27, 6.39, 6.46, 6.65, 7.13, 7.46, 7.80, 8.11, 9.10, 9.24, 9.33, 9.63, 9.98, 10.89, 11.61, 12.32, 13.4, 13.9, and 14.2.

The infrared absorption curve of the above-mentioned mull is shown as Figure I in the accompanying drawing.

An ultraviolet absorption spectrum of the antibiotic in methanol shows the intense absorption maxima of 375 m$\mu$, 294 m$\mu$, and 246 m$\mu$ having the following respective extinction coefficients: 16,800; 27,100; and 40,400.

A powder X-ray diffraction pattern using unfiltered chromium radiation and a wave-length value of 2.2896 A. in calculating the interplanar spacings gives the following values:

| "d" | $I/I_1$ |
|---|---|
| 13.4 | 1.00 |
| 8.05 | 0.13 |
| 7.77 | 0.53 |
| 6.29 | 0.53 |
| 5.73 | 0.07 |
| 5.54 | 0.13 |
| 5.34 | 0.20 |
| 4.67 | 0.67 |
| 4.43 | 0.20 |
| 4.39 | 0.13 |
| 4.13 | 0.53 |
| 4.04 | 0.13 |
| 3.85 | 0.13 |
| 3.78 | 0.07 |
| 3.71 | 0.13 |
| 3.58 | 0.67 |
| 3.24 | 0.13 |
| 2.94 | 0.20 |
| 2.78 | 0.07 |
| 2.69 | 0.07 |
| 2.57 | 0.07 |
| 2.44 | 0.07 |
| 2.22 | 0.07 |
| 2.06 | 0.07 |

Chemical tests made on the crystalline antibiotic show the presence of phenolic, methoxy, and carboxy groups. The antibiotic shows positive results in the following chemical tests: Fehlings and permanganate tests for reducing groups, Folin-Malmros and Folin-Ciocalteau tests for phenolic groups, and the Molisch test for the presence of a carbohydrate portion of the molecule. The crystalline antibiotic yields a negative ninhydrin test. When the antibiotic is dissolved in a basic solution above about pH 9.5 such as in an aqueous sodium hydroxide solution, the solution is yellow in color. However, if the pH of the solution is promptly lowered to a pH of about 7.0 or lower the solution turns red in color.

When the crystalline acid is chromatographed employing Whatman No. 1 paper and applying valacidin to the paper in a polar solvent such as acetone, it has the following $R_f$ values as determined bioautographically in the named solvents: $R_f=0.40$ in n-butanol saturated with water, $R_f=0.75$ in n-butanol saturated with water and containing 2 percent p-toluene sulfonic acid monohydrate, and $R_f=0.0$ in methyl-isobutyl ketone saturated with water and containing 2 percent piperidine.

The antibiotic and its salts are characterized by a broad antibacterial spectrum including both gram-positive and gram-negative bacteria, some of which are plant pathogens. The bacteria against which they are active include organisms resistant to a number of known antibiotics. The activity of the antibiotic against illustrative organisms is shown in Table I which numerically sets forth its inhibitory action against a variety of organisms. The antibiotic activities were determined by the streak-dilution test which comprised streaking the test organism on a series of agar plates containing various concentrations of the antibiotic to determine the minimum concentration of antibiotic in mcg./ml. of an agar substrate, which inhibited organism growth over a period of forty-eight hours, or seventy-two hours in the case of the plant pathogen organisms. The antibiotic salts possess activities corresponding to the values given in Table I making allowances for the increased molecular weights of the salts.

TABLE I

| Test Organism | Inhibitory concentration (mcg./ml.) |
|---|---|
| Bacteria: | |
| Klebsiella pneumoniae (erythromycin resistant) | .2 |
| Micrococcus pyogenes var. aureus | .1 |
| Micrococcus pyogenes var. aureus (erythromycin resistant) | .39 |
| Micrococcus pyogenes var. aureus (penicillin resistant) | .78 |
| Micrococcus pyogenes var. aureus (streptomycin resistant) | .2 |
| Staphylococcus aureus | .048 |
| Staphylococcus albus | .048 |
| Bacillus subtilis | .097 |
| Mycobacterium phlei | .39 |
| Mycobacterium tuberculosis (607) | .78 |
| Mycobacterium avium | .78 |
| Escherichia coli | .78 |
| Proteus vulgaris | .195 |
| Pseudomonas aeruginosa | 3.13 |
| Aerobacter aerogenes | 1.56 |
| Klebsiella pneumoniae | .097 |
| Salmonella enteritidis | .78 |
| Shigella paradysenteriae | .39 |
| Brucella bronchiseptica | .195 |
| Vibrio metschnikovii | 1.56 |
| Bacterial Plant Pathogens: | |
| Erwinia amylovora | 1.56 |
| Agrobacterium tumefaciens | 50 |
| Xanthomonas campestris | 50 |
| Xanthomonas malvacearum | .78 |
| Xanthomonas phaseoli | .78 |
| Pseudomonas solanacearum | 6.25 |
| Pseudomonas syringae | 6.25 |
| Corynebacterium insidiosum | 50 |
| Corynebacterium sepodonicum | <.195 |

Because of its broad and highly potent antibiotic activity and other properties, the antibiotic is broadly useful as a preserving agent. Illustratively, it can be used as a preserving agent in various externally used compositions, and in fluids used for preservation of cadavers and specimens of animal source. It is particularly useful in improving the preserving capacities and properties of commonly used embalming fluids, for example those containing formaldehyde. The addition to such type of embalming fluid of about 1.0 mg. of valacidin or a salt thereof per milliliter of fluid yields a preparation having enhanced preservative properties.

Furthermore, the antibiotic can be usefully employed to control certain plant pathogens such as X. phaseoli and Alternaria solani. To control such plant pathogens, the antibiotic is preferably compounded in sprays, dusts and the like such as commonly employed by those skilled in the art of controlling plant diseases.

The antibiotic can be produced by culturing a newly found and hitherto undescribed organism strain isolated from a soil sample obtained from Ongko, Indonesia. The organism is grown using submerged culture fermentation under aerobic conditions in a culture medium containing assimilable sources of carbon, hydrogen, and inorganic salts. The organism was isolated from the above soil sample by suspension of a portion of the soil sample in sterile distilled water, and by plating the suspension after dilution on nutrient agar. The seeded nutrient agar plate was incubated at about 25–35° C. for several days. At the end of the incubation time, colonies of the valacidin-producing organism are transferred with a sterile platinum loop to inoculate agar slants. The inoculated agar slants are incubated to provide larger amounts of inoculum for the production of the antibiotic.

The novel organism has been placed on permanent deposit with The Culture Collection of the Northern Utilization Research and Development Branch of the U.S. Department of Agriculture, Peoria, Illinois, and has been assigned the culture number NRRL 2675.

The newly discovered organism has much similarity to the description of the species *Streptomyces lavendulae* coming under the order *Actinomycetales* as defined in Bergey's Manual of Determinative Bacteriology, 6th edition, page 944. Although there is much inherent uncertainty in classification of such microorganisms, it is believed justifiable notwithstanding certain distinguishing differences to classify the novel organism NRRL 2675 as a strain of the sepcies *S. lavendulae* and to consider Waksman's strain of *S. lavendulae*, obtained from the American Type Culture Collection and identified as ATCC 8664 (Waksman 3440) to be the most closely related, previously known organism.

The Waksman strain of *S. lavendulae*, the most closely related strain to our strain NRRL 2675, has been grown using the preferred media herein described but no detectable amount of valacidin was produced.

This invention will be described with particular reference to the newly found organism. However, it will be understood that the production of the antibiotic by the growing of other antibiotic organisms such as other valacidin-producing strains or mutants of *S. lavendulae* NRRL 2675 are to come within the scope of this invention. Such other organisms, strains or mutants are produced in the customary manner, as by subjecting a valacidin-producing organism to X-ray or ultraviolet irradiation, or to chemical agents, for example nitrogen mustards.

In the following paragraphs, the results of a detailed taxonomic study of the above antibiotic-producing strain of *S. lavendulae* are set forth. The colors used in the description are defined in accordance with the definitions used in Ridgway: Culture Standards and Nomenclature (1912).

Microscopic morphology

*Glucose-asparagine agar (14 days at 30° C.).*—Typical prostrate, branching, substratal mycelium and moderately branched aerial mycelium. Ovoid conidia borne in very long straight chains which are not extensively branched. No conidial chains in spiral arrangement were found.

*Bennett's agar (14 days at 30° C.).*—Microscopic morphology like that observed on glucose-asparagine agar.

Colonial morphology

*Bennett's agar (14 days at 30° C.).*—Colonies flat, spreading, size varying inversely with the number of colonies per plate, with diameters ranging from 4 to 10 mm. Surface powdery, radially striated, with or without central papilla. Margin very filamentous. Aerial mycelium light gray, reverse of colonies usually dark gray around periphery and dark brown to black in the central area.

Cultural characteristics

*Synthetic agar (Czapek's as modified by Waksman [1919]).*—Trace of substratal growth, no aerial mycelium and no soluble pigment.

*Glucose-asparagine agar.*—Moderate amount of deeply burrowing substratal mycelium, light cream color on reverse side. Aerial mycelium moderate in amount, powdery, white becoming pale gray at 14 days. Growth slowly spreading, margin becoming very filamentous by 28 days. Soluble pigment very pale greenish-yellow (trace amount) or absent.

*Starch agar (Waksman [1919], page 82, medium 15 with soluble starch).*—Moderate amount of substratal mycelium, reverse colorless to very pale cream color. Trace of white aerial mycelium. Growth restricted to line of inoculation. No soluble pigment.

*Calcium malate-glycerol agar.*—Moderate to good growth of substratal mycelium, dull cream color on reverse side. Trace of white aerial mycelium along smooth margin of streak. Medium cleared in area near growth. Growth restricted. Trace of very pale greenish-yellow soluble pigment.

*Waksman's nutrient agar.*—Moderate amount of substratal mycelium; reverse cream colored. No aerial mycelium. Growth restricted to line of inoculation, margin finely undulate. Surface of growth dull, smooth. Moderate amount of brown soluble pigment.

*Emerson's agar.*—Good growth of substratal mycelium, reverse color light brown in young cultures deepening to Snuff Brown at 14 days. Aerial mycelium abundant, white becoming light bluish gray mottled with white at 14 days. Mycelial pigment near Pale Violet-Gray. Growth spreading, moderately burrowing. Surface powdery. Some brown soluble pigment formed.

*Potato plug.*—Moderate substratal growth; aerial mycelium abundant, powdery, grayish-white to light gray. Growth spreading over entire plug, wrinkled. Plug slightly discolored (slate gray).

*Gelatin.*—Slight to moderate amount of flocculent floating growth, not forming intact pellicle and lacking aerial mycelium. Dark brown soluble pigment. Relatively rapid liquefaction starting in 4 days, reaching 4 to 5 mm. in 7 days, about 15 mm. in 14 days; complete in 17 days.

*Synthetic broth (synthetic agar minus agar).*—No growth.

*Tyrosine broth.*—No growth.

*Glucose nutrient broth.*—Wide ring of dull brownish cream colored growth on wall of tube, no aerial mycelium. Small amount of unattached, flocculent submerged growth. Trace of brown soluble pigment.

*Litmus milk (30° C.).*—Wide ring of dull grayish growth with no aerial mycelium. Blackish soluble pigment and heavy sediment. No coagulation or hydrolysis of casein after 14 days, slight hydrolysis indicated by casein precipitation test after 28 days. Litmus color obscured by pigment; final pH 7.82 (pooled sample at 28 days).

*Litmus milk (37° C.).*—Growth less abundant than at 30° C. No hydrolysis of casein. Changes otherwise like those at 30° C. Final pH 7.70.

In Tables II and III are set forth the results of nutrient utilization tests carried out on the organism strain NRRL 2675. In the tables the following symbols are employed:

+ = growth and utilization
− = no growth, no utilization
± = limited growth, probably poor utilization
(−) = scant growth, probably no utilization

TABLE II.—CARBON UTILIZATION PATTERN FOR NRRL 2675

| Compound | Growth Response |
|---|---|
| Adonitol | − |
| L (+) arabinose | − |
| L (+) rhamnose (hydrate) | − |
| D (+) xylose | − |
| D-mannitol | − |
| D-sorbitol (hydrate) | − |
| D (+) glucose | + |
| Cellobiose | − |
| Lactose | − |
| D (+) melibiose (hydrate) | − |
| Sucrose | (−) |
| D (+) trehalose | ± |
| D (+) melezitose (hydrate) | − |
| D (+) raffinose (hydrate) | − |
| Inulin | − |
| Cellulose | − |
| L-asparagine (as carbon) | ± |
| Esculin | (−) |
| i-inositol | − |
| Salicin | − |
| Sodium citrate | ± |
| Control (no carbon) | − |

TABLE III.—NITROGEN UTILIZATION PATTERN FOR NRRL 2675

| Compound | Growth Response |
|---|---|
| Ammonium sulfate | + |
| Sodium nitrate | + |
| L-asparagine (as nitrogen) | − |
| Urea | + |
| Control (no nitrogen) | − |

*Physiology*

Starch hydrolysis—moderately rapid
Cellulose utilization—none
Proteolytic activity—casein hydrolyzed slightly if at all
Gelatin—hydrolyzed at a moderate rate
Reduction of nitrate to nitrite—chemical tests showed no reduction of nitrate to nitrite after growth for periods of 14 and 28 days on all carbon sources utilized including glycerol, glucose, and starch.

As above noted, valacidin can be produced by cultivation of the novel strain of *S. lavendulae*, NRRL 2675. The culture medium can be any one of a number of media since, as is apparent from the above-dsecribed utilization tests, the organism is capable of utilizing many energy sources. However, for economy of production, maximum yields of antibiotic, and ease of isolation of the antibiotic, certain culture media are preferable. The media which are useful in the production of the antibiotic valacidin include an assimilable source of carbon such as glucose, sucrose, starch, glycerine, molasses, sorbitol, dextrine, brown sugar, mannitol, corn steep solids, and the like. The preferred sources of carbon are glucose and starch. Also, employable media include a source of assimilable nitrogen such as linseed meal, tankage, fish meal, corn meal, cotton seed meal, oatmeal, ground wheat, soybean meal, beef extract, peptones (meat or soy), casein, amino acid mixtures, and the like. Preferred sources of nitrogen are soybean meal, casein, and corn steep solids.

Mineral salts such as for example those providing sodium, potassium, ammonium, calcium, magnesium, sulfate, chloride, phosphate, and nitrate ions, and a source of growth factors such as distillers' solubles and yeast extract, can be incorporated with beneficial results.

As is necessary for the growth and development of other microorganisms, essential trace elements should also be included in the culture medium for growing the actinomycete employed in this invention. Such trace elements are commonly supplied as impurities incidental to the addition of the other constituents of the medium.

The initial pH of the culture medium can be varied widely. However, it has been found desirable that the initial pH of the medium be between about pH 5.5 and pH 8.0, and preferably about pH 6.5 to pH 7.0. As has been observed with other actinomycetes, the pH of the medium gradually increases throughout the growth period of the organism during which time the antibiotic is produced and may attain a pH from about pH 7.2 to about pH 8.0 or above, the final pH being dependent at least in part on the initial pH of the medium, the buffers present in the medium, and the period of time the organism is permitted to grow.

As is preferred for the production of other antibiotics in massive amounts, submerged, aerobic cultural conditions are the conditions of choice for the production of large amounts of valacidin. For preparation of relatively small amounts, shake flasks and surface culture in bottles can be employed. For the preparation of large amounts of the antibiotic, submerged aerobic culture in pre-sterilized tanks is desirable. The media in the sterilized tanks can be inoculated by the use of a sporulated suspension, but because of the growth lag experienced in a sporulated suspension used as the inoculum it is preferred to inoculate using the vegetative form of the culture. By thus avoiding the growth lag, more efficient use of the fermentation equipment is realized. Accordingly, it is desirable first to produce a vegetative inoculum of the organisms by inoculating a relatively small quantity of culture medium with the spore form of the organism, and when a young, active, vegetative inoculum has been obtained, to transfer the vegetative inoculum aseptically to the large tanks. The medium in which the vegetative inoculum is produced can be the same or a different medium than that utilized for the large scale production of the antibiotic.

The organisms grow best at temperatures in a range of about 25° C. to about 32° C. Optimal antibiotic production appears to occur at a temperature of about 26–30° C.

As is customary in producing antibiotics by submerged culture processes, sterile air is blown through the culture medium. For efficient growth of the organism and antibiotic production, the volume of air employed in the tank production of valacidin preferably is upwards of 0.1 volume of air per minute per volume of culture medium. Efficient growth and antibiotic production are obtained when the volume of air used is at least 1 volume of air per minute per volume of culture medium.

The rate of production of the antibiotic and the concentration of the antibiotic activity in the culture medium can readily be followed during the growth period of the microorganism by testing samples of the culture medium for their antibiotic activity against the growth of an organism known to be inhibited in the presence of the antibiotic. The use of the organism, Staphylococcus aureus, has been found to be very satisfactory for such testing. The testing can be carried out by the standard turbidimetric or cup-plate methods.

In general, maximum production of the antibiotic after inoculation of the culture medium occurs within about 2 to 5 days when submerged aerobic culture or shake flask culture is employed, and within about 5 to 10 days when surface culture is used.

The mycelia and undissolved solids are removed from the fermentation broth by conventional means such as by filtration or centrifugation. The antibiotic is removed from the filtered or centrifuged broth by employing adsorption or extraction techniques. It is preferred to employ an extraction procedure in recovering the antibiotic from the filtered broth since such extraction procedures are usually more rapid, efficient, and economical in antibiotic recovery. For the extraction of the antibiotic substance from the filtered broth, water-immiscible, polar organic solvents are preferred, such including esters of fatty acids, for example, ethyl acetate and amyl acetate; chlorinated hydrocarbons, for example, chloroform, ethylene dichloride, and trichloroethylene; water-immiscible alcohols such as butyl and amyl alcohols; water-immiscible ketones such as methyl-isobutyl ketone and methylamyl ketone; and ethers, for example, ethyl ether and dibutyl ether. Other solvents of similar character can also be employed. Chloroform and amyl acetate are the presently preferred extraction solvents.

In the use of adsorption techniques, various adsorbents and ion exchange resins can be used, for example, carbon and ion exchange resins of basic character such as "Permutit" DR (an amine-formaldehyde type ion exchange resin as described in Patent No. 2,671,059 and sold by the Permutit Co.), "Amberlite" IRA-400 (a strongly basic quaternary amine-styrene type ion exchange resin as described in U.S. Patent No. 2,591,573 and sold by Rohm & Haas Company), and "Amberlite" IR-4B (a phenol-formaldehyde type ion exchange resin sold by Rohm and Haas Co.). Such use of adsorbents usually provides lesser yields of the antibiotic substance than that obtained by using the extraction procedures.

The organic solvent extracts obtained by the preferred extraction method can be directly evaporated to dryness to provide the crude antibiotic. Preferably, however, the organic solvent extracts are used in obtaining more purified forms of the antibiotic. For example, an antibiotic-containing extract can be evaporated in vacuo to a small volume. The antibiotic of the concentrate can be extracted with a weakly basic aqueous solution such as a 2 percent sodium hydroxide. The antibiotic can be extracted from resulting aqueous extract after acidification with a polar organic solvent. The organic solvent extract can be re-extracted with an aqueous basic solution, and the aqueous extract then acidified to pH 3 or below, causing the antibiotic to be precipitated. Alternatively, the antibiotic can be precipitated from an antibiotic containing organic solvent extract by the addition of a nonpolar solvent such as for example a 5- to 10-fold excess of petroleum ether. As a further alternative, the antibiotic can be recovered from the organic extract by adsorption chromatography by employing such adsorbents as silicic acid, alumina, and Florisil (a synthetic silicate of the type described in U.S. Patent No. 2,393,625 and sold by the Floridin Co.) or ion exchange resins such as those hereinabove named. The adsorbed antibiotic can be removed from the adsorbent in relatively pure form by elution with agents such as suitable polar organic solvents, e.g. those hereinabove mentioned as desirable for use in extraction of the filtered broth.

The salts of valacidin are formed employing the free acid of valacidin and an inorganic or organic base. The valacidin salts can be prepared as for example by suspending the free acid of valacidin in water, adding a dilute base until the pH of the mixture is about pH 7.5, and freeze-drying the alkaline mixture to provide a dried residue consisting of the valacidin salt. Valacidin salts which can be formed include the sodium, potassium, calcium, and magnesium salts. However, other salts of valacidin including those formed with organic bases such as tributylamine and diethanolamine, can be formed using the above-described or other commonly employed procedures.

The invention is further illustrated by the following specific examples.

EXAMPLE 1.—PREPARATION OF VALACIDIN

A sporulated culture of NRRL 2675 is produced by growing the organism on a nutrient agar slant made from a medium having the following composition:

| | G. |
|---|---|
| Starch | 20 |
| Asparagine | 1 |
| Beef extract | 3 |
| Agar | 20 |

Water added to make a total volume of 1 l.

The slant is inoculated with spores, and is incubated for five days at about 26° C. The sporulated culture on the slant is covered with water, and the slant is scraped gently to remove the spores to provide an aqueous spore suspension.

1 ml. of the spore suspension is used for inoculating under aseptic conditions a 100 ml. portion of the following sterilized vegetative culture medium:

| | G. |
|---|---|
| Glucose | 15 |
| Soy bean meal | 15 |
| Corn steep solids | 5 |
| Sodium chloride | 2 |
| Calcium carbonate | 2 |

Water added to make a total volume of 1 l.

The inoculated vegetative medium is incubated at about 26° C. for 48 hours, during which time the incubate is shaken at the rate of 110 revolutions per minute on a reciprocal shaker having a 2-inch stroke.

5 ml. of the thus provided vegetative inoculum is used to inoculate aseptically 100 ml. portions of the following sterilized production medium contained in 500 ml. Erlenmeyer flasks:

| | | |
|---|---|---|
| Soy bean meal | g | 15 |
| Casein | g | 1 |
| Crude glucose syrup | ml | 20 |
| Calcium carbonate | g | 2.5 |
| Sodium nitrate | g | 3 |

Water added to make a total volume of 1 l.

The inoculated culture is incubated for 100 hours at about 26–28° C. During the incubation period, the incubate is shaken at 114 revolutions per minute on a reciprocal shaker with a 2-inch stroke. The pH of the starting media is about pH 6.5. At the end of the incubation period, the pH of the medium increases to about pH 7.5.

The culture broth obtained is filtered to remove the mycelium and other undissolved solids. The filtered broth contains the produced antibiotic.

EXAMPLE 2.—PREPARATION OF VALACIDIN

A sporulated culture of the NRRL 2675 is produced by growing the organism on a nutrient agar slant having the following composition:

Emerson's agar:

|   | G. |
|---|---|
| Beef extract | 4 |
| Peptone | 4 |
| Sodium chloride | 2.5 |
| Yeast extract | 1 |
| Glucose | 10 |
| Agar | 20 |

Water, added to make a total volume of 1 l.

The slant is inoculated with spores of NRRL 2675 and the inoculated slant is incubated for four days at a temperature of about 28° C. After incubation, the sporulated culture of the slant is covered with water, and the surface of the slant is scraped gently to remove the spores to obtain an aqueous spore suspension.

Employing aseptic techniques, one-half of the inoculum obtained from one agar slant is used for inoculating a 500 ml. portion, contained in a 2 l. Erlenmeyer flask, of the following sterilized vegetative culture medium:

Corn steep soy XII medium:

|   | G. |
|---|---|
| Glucose | 15 |
| Soybean oil meal | 15 |
| Corn steep solids | 5 |
| Calcium carbonate | 2 |
| Sodium chloride | 5 |
| Antifoam | 0.1 |

Water added to make a total volume of 1 l.

The incubation is carried on at 28° C. for 48 hours with shaking at 110 revolutions per minute on a reciprocal shaker having a 2-inch stroke.

0.25 gal. (0.1 percent by volume) of the vegetative inoculum from the flask are added aseptically as an inoculum to 250 gal. of a sterile corn steep soy XII medium contained in an iron 350 gal. fermenter tank. The inoculated medium is fermented for 24 hours at a temperature of 28° C. Antifoam is added as needed. During fermentation, the medium is aerated with sterile air at a rate of 30 cubic feet per minute, and the medium is agitated with two 16-inch impellers operated at 160 revolutions per minute.

To a 1700 gal. iron fermenter, 1200 gal. of the following medium are added:

Casein soy I medium:

|   | G. |
|---|---|
| Glucose | 30 |
| Soybean oil meal | 20 |
| Casein (purified) | 1 |
| Calcium carbonate | 2.5 |
| Sodium nitrate | 3 |
| Antifoam | 0.1 |

Water added to make a total volume of 1 l.

The medium is inoculated with 96 gal. (8 percent by volume) of the inoculum grown in the fermentation tank. The fermentation is carried on at 28° C. for three days. The foam is controlled by addition of antifoam agent as needed. The fermentation medium is aerated by the addition of sterile air at the rate of 144 cubic feet per minute and is agitated with two 24-inch impellers operated at 100 revolutions per minute.

The pH of the medium at the end of the incubation period is about pH 5.9. 250 lbs. of diatomaceous earth filter aid are added, and the mixture is filtered. 250 gal. of chloroform are added to the filtrate, the chloroform mixture is stirred for 45 minutes, and the stirred mixture is permitted to stand for about two days. The chloroform layer consisting of an emulsion and containing valacidin is decanted. The chloroform is removed from the decanted chloroform emulsion with a DeLaval separator. The separated chloroform consists of 214 gal. The remaining aqueous phase is re-extracted with 155 gal. of chloroform. The chloroform of the second extract is added to the first chloroform extract, and combined extracts are concentrated in vacuo to 2.6 gal. The chloroform concentrate is cooled to and maintained at about 4–6° C. for a few days during which time valacidin crystallizes out. The crystalline valacidin is filtered off, is washed two times with petroleum ether, and is dried in vacuo.

The filtrate is further concentrated in vacuo to 1.18 gal. causing an additional amount of the antibiotic to crystallize out. The crystalline antibiotic is removed by filtration, and is washed and dried in vacuo in the manner described above.

EXAMPLE 3.—PREPARATION OF THE SODIUM SALT OF VALACIDIN 500 mg. of the crystalline free acid of valacidin are suspended in 100 ml. of water. To the suspension, 0.1 N sodium hydroxide is added dropwise with stirring to adjust the pH to 7.5. The alkaline mixture is freeze-dried yielding the sodium salt of valacidin. As distinguished from the free acid of valacidin, the sodium salt is soluble in water.

EXAMPLE 4.—PREPARATION OF THE POTASSIUM SALT OF VALACIDIN 500 mg. of the crystalline free acid of valacidin are suspended in 100 ml. of water. To the suspension, 0.15 N potassium hydroxide are added dropwise with stirring to adjust the pH to 7.5. The alkaline mixture is freeze-dried yielding the potassium salt of valacidin. The potassium salt of valacidin is soluble in water.

EXAMPLE 5.—PREPARATION OF THE CALCIUM SALT OF VALACIDIN 200 mg. of the crystalline free acid of valacidin are suspended in 50 ml. of water. To the suspension, 0.1 N calcium hydroxide is added dropwise with stirring to adjust the pH to 7.5. The alkaline mixture is freeze-dried yielding the calcium salt of valacidin. The calcium salt of valacidin is soluble in water.

We claim:

1. A method of producing valacidin which comprises cultivating a valacidin-producing strain of *Streptomyces lavendulae* in a culture medium containing assimilable sources of carbon, nitrogen and inorganic salts, under submerged aerobic conditions until a substantial amount of valacidin is produced by said organism in said culture medium.

2. A method according to claim 1 in which the organism is *Streptomyces lavendulae* NRRL 2675.

3. A method according to claim 1 in which the culture medium is maintained at a temperature of about 25–32° C., and the growth of the organism is carried out for a period of from two to five days.

4. A method of producing valacidin which comprises cultivating a valacidin-producing strain of *Streptomyces lavendulae* in a culture medium containing assimilable sources of carbon, nitrogen and inorganic salts, under submerged aerobic conditions until a substantial amount of valacidin is produced by said organism in said culture medium, and recovering the valacidin from said culture medium.

5. An antibotic substance of the group consisting of valacidin and its cationic salts, the said valacidin being characterized as a reddish-brown solid substance, soluble in alkaline aqueous solutions and in most polar solvents, slightly soluble in lower alcohols, substantially insoluble in most nonpolar organic solvents and in aqueous acid solution, stable in aqueous solution at a pH in the range of about pH 1.0 to pH 9, having a molecular weight of about 500 as determined by titration, having shown upon analysis the presence of 60.01 percent carbon, 4.66 percent hydrogen, 10.80 percent nitrogen, and, by difference, 24.53 percent oxygen, the said analytical values establishing the empirical formula, $C_{26}H_{24}O_8N_4$, having an ionizable group of pK'α 7.0 as determined by electrometric titration in dimethyl formamide-water solution (2:1, parts by volume), having spectral absorption maxima as a mineral oil mull in the infrared region over the range of about 2 to about 15 microns at about the following wave lengths expressed in microns: 2.90, 2.98, 3.07, 5.74, 5.95, 6.09, 6.18, 6.27, 6.39, 6.46, 6.65, 7.13, 7.46, 7.80, 8.11, 9.10, 9.24, 9.33, 9.63, 9.98, 10.89, 11.61, 12.32, 13.4, 13.9, and 14.2, and having spectral absorption maxima in the ultraviolet region at about the following wave lengths: 375 mμ, 294 mμ, and 246 mμ with extinction coefficients, respectively, of about 16,800, 27,100, and 40,400.

6. The antibiotic, valacidin, as set forth in claim 5.

7. A cationic salt of valacidin as set forth in claim 5.

References Cited in the file of this patent

Pridham et al.: Applied Microbiology, January 1958, pp. 52–79.